United States Patent
Muthupandi et al.

(10) Patent No.: US 10,032,095 B2
(45) Date of Patent: Jul. 24, 2018

(54) SYSTEMS AND METHODS FOR AUTOMATICALLY MODIFYING IMPOSITION USING DYNAMICALLY LOADED MEDIA SIZE ON A CONTINUOUS FEED PRINTER

(71) Applicant: Xerox Corporation, Norwalk, CT (US)

(72) Inventors: Rajakani Muthupandi, Reno, NV (US); Bridget Anne Thomson, Hawthorne, CA (US); Carl Edwin Gadow, Torrance, CA (US)

(73) Assignee: Xerox Corporation, Norwalk, CT (US)

( * ) Notice: Subject to any disclaimer, the term of this patent is extended or adjusted under 35 U.S.C. 154(b) by 148 days.

(21) Appl. No.: 14/688,164

(22) Filed: Apr. 16, 2015

(65) Prior Publication Data
US 2016/0307076 A1    Oct. 20, 2016

(51) Int. Cl.
*H04N 1/00* (2006.01)
*G06K 15/02* (2006.01)

(52) U.S. Cl.
CPC ....... *G06K 15/181* (2013.01); *G06K 15/1823* (2013.01); *G06K 15/1825* (2013.01); *G06K 15/1868* (2013.01)

(58) Field of Classification Search
CPC .................................................. G06K 15/181
See application file for complete search history.

(56) References Cited

U.S. PATENT DOCUMENTS

| | | | | |
|---|---|---|---|---|
| 5,634,091 A | * | 5/1997 | Sands | B41B 19/00 101/453 |
| 7,502,137 B2 | | 3/2009 | Morales et al. | |
| 7,944,581 B2 | * | 5/2011 | Shepherd | G06F 17/214 345/471 |
| 8,320,008 B2 | | 11/2012 | Jahn | |
| 8,456,690 B2 | * | 6/2013 | Morales | H04N 1/387 358/1.18 |
| 2008/0225327 A1 | * | 9/2008 | Smith | G06F 3/1288 358/1.15 |
| 2009/0027728 A1 | | 1/2009 | Aronshtam | |
| 2011/0148974 A1 | * | 6/2011 | Robinson | B41J 11/008 347/19 |
| 2011/0293349 A1 | * | 12/2011 | Tombs | B41J 11/008 400/583 |

* cited by examiner

*Primary Examiner* — King Poon
*Assistant Examiner* — Michael Burleson
(74) *Attorney, Agent, or Firm* — Gibb & Riley, LLC (57) ABSTRACT

Systems and methods for modifying imposition parameters using dynamically loaded media sizes. A print job is received into a computerized device comprising a marking device. The print job comprises an electronic document and print job attributes and imposition defining an arrangement of images in the electronic document for predefined dimensions of continuous feed print media. A change in print media being fed into the marking device is automatically detected, using the computerized device. The print job attributes are automatically modified, using the computerized device, based on the change in the print media, without further operator intervention.

11 Claims, 12 Drawing Sheets

SYSTEMS AND METHODS FOR AUTOMATICALLY MODIFYING IMPOSITION USING DYNAMICALLY LOADED MEDIA SIZE ON A CONTINUOUS FEED PRINTER

BACKGROUND

Systems and methods herein generally relate to printing systems and, more particularly, to automation of the imposition of print job parameter selection processes related to rendering imposed documents.

In modern desktop printing systems, a document can be created or received in electronic form on a device such as a personal computer, a personal digital assistant, or other suitable device. Parameters of print jobs (such as for finishing, imposition, color management) can be set at the print queue, print job, page description language (PDL) creation, exception page creation, line printer remote (LPR), and job ticket level. Imposition settings are job settings that cause page images to be placed on print media at specific locations, orientations, and scalings. For example, a user can format the document, adjust the layout of the document, change fonts, change font sizes, etc. These settings are reconciled before a job is submitted for print. Thereafter, the document can be printed on a printer to produce a hardcopy of the document. The hardcopy of the document can further be bound or otherwise subjected to processing to result in a finished product.

Imposition is one of the fundamental steps in the prepress printing process. It consists in the arrangement of the printed product's pages on the printer's sheet, in order to print faster, simplify binding, and reduce paper waste. In particular, it allows the printer to set up such documents as business cards, magazines, flyers, postcards, and brochures. Print operators will print books using large sheets of paper that will be folded later. This allows for faster printing, simplified binding, and lower production costs. Imposition is the process of arranging the pages correctly prior to printing so that they fold in the correct order. To someone unfamiliar with the imposition process, the pages may seem to be arranged randomly; but after printing, the paper is folded, bound, and trimmed. If correctly imposed, the pages all appear in the correct orientation and readable sequence.

Programming of the job parameters associated with document imposition remains one of the more complicated aspects of job programming printing control systems. This complexity impacts the users' ability to properly program imposition parameters and their ability to include imposition as part of a more automated workflow. Correct imposition minimizes printing time by maximizing the number of pages per impression, reducing cost of press time and materials.

Whenever there is a change in web stock width and length on a continuous feed infinite roll paper, there is a need to re-design the multiple impositions to handle multiple web stock sizes. For example, the imposition designer would need to define an imposition and queue for each of several different sizes of web stock. Considering the large number of web stock combinations requires numerous impositions and, therefore, requires extra work for the printer operator to change the imposition whenever there is a change in web stock sizes. The engine may fault the job in cases where the operator has modified the paper size dimensions at the continuous feed printer, and the dimensions no longer match the imposed sheet dimensions when the job goes to print.

SUMMARY

In one aspect of systems and methods for automatically defining the imposition according to the loaded stock size values on continuous feed printer disclosed herein, whenever there is a change in loaded web stock size on the continuous feed printer, the changes are notified to the imposition software and the print jobs are dynamically imposed according to the loaded stock size values. In other words, the dynamically loaded media sizes are inferred based on inputs from the interface engine and any manual imposition may be overridden. Job pages are automatically positioned within the imposed frame (shortest conceptual boundary around the logical page layout on the web frame).

For automatic position of the imposed frame, the imposed frame and valid printable area on the web size values are recalculated according to the dynamically loaded media size values, and the pages are automatically positioned within the new imposed frame. The imposed frame contains the composite page with one or more pages. This avoids printer faults because of a mismatch in loaded media size according to the printer impositions. If centering is specified in the original imposition, then automatic imposition continues to honor centering with loaded stock size values. According to the dynamically loaded media size values, centering may overwrite the position offsets of individual pages but will preserve the relative spacing of the individual pages on the sheet.

According to exemplary methods herein, a print job is received into a computerized device comprising a marking device. The print job comprises an electronic document and print job attributes defining an arrangement of images in the electronic document for predefined dimensions of continuous feed print media. A change in print media being fed into the marking device is automatically detected, using the computerized device. The print job attributes are automatically modified, using the computerized device, based on the change in the print media, without further operator intervention.

According to other exemplary methods herein, an electronic document having a print job ticket comprising an imposition template is received into a computerized device. The computerized device automatically detects a change in print media being fed into the computerized device. The computerized device automatically prepares revised imposition parameters corresponding to the change in the print media. The computerized device outputs the electronic document using the revised imposition parameters.

According to an exemplary continuous feed printing device, a marking device receives an electronic document. The continuous feed printing device includes a sensor determining media properties of a substrate being fed into the marking device. A processor is connected to the marking device and receives a property signal from the sensor. The sensor automatically detects a change in media properties of the substrate being fed into the marking device. The processor automatically prepares a revised imposition having different imposition parameters based on the change in the print media. The electronic document is output from the computerized device. The processor causes the marking device to print the electronic document on the substrate using the revised imposition.

According to exemplary marking devices, a processor receives images of a document and instructions to print the document using print job and imposition parameters defining a first arrangement of the images in the document. The processor automatically detects print media being fed into a marking device. The processor automatically transforms the first arrangement of the images in the document into a second arrangement of the images based on dimensional properties of the print media being fed into the marking device, without further operator intervention. The processor automatically imposes the job according to the second arrangement of the images. The processor outputs the document to the marking device using the revised imposition.

These and other features are described in, or are apparent from, the following detailed description.

BRIEF DESCRIPTION OF THE DRAWINGS

Various examples of the systems and methods are described in detail below, with reference to the attached drawing figures, which are not necessarily drawn to scale and in which.

DETAILED DESCRIPTION

The disclosure will now be described by reference to a continuous feed printing device that includes a print engine having a digital image processor. While the disclosure will be described hereinafter in connection with specific systems and methods thereof, it will be understood that limiting the disclosure to such specific systems and methods is not intended. On the contrary, it is intended to cover all alternatives, modifications, and equivalents as may be included within the spirit and scope of the disclosure as defined by the appended claims.

For a general understanding of the features of the disclosure, reference is made to the drawings. In the drawings, like reference numerals have been used throughout to identify identical elements.

The present disclosure relates to automatic printing and particularly to automatic printing of more than one image on a single sheet of print media, for example, where pages are to be imposed and printed on a single sheet for subsequent cutting of the pages or folding to create a multiple page folded document.

In digital printing in roll fed or sheet printers, it has been desired to reduce the time required for pre-press operations. Thus, it has been desired to provide methods for defining discrete areas on imposed documents in order that automatic placement of the images on the imposed document may be accomplished in various combinations and arrangements without the need for individual templates. Examples of such arrangements are centering of the images on the document or arranging the images for various web lengths and web widths.

Figure 1:
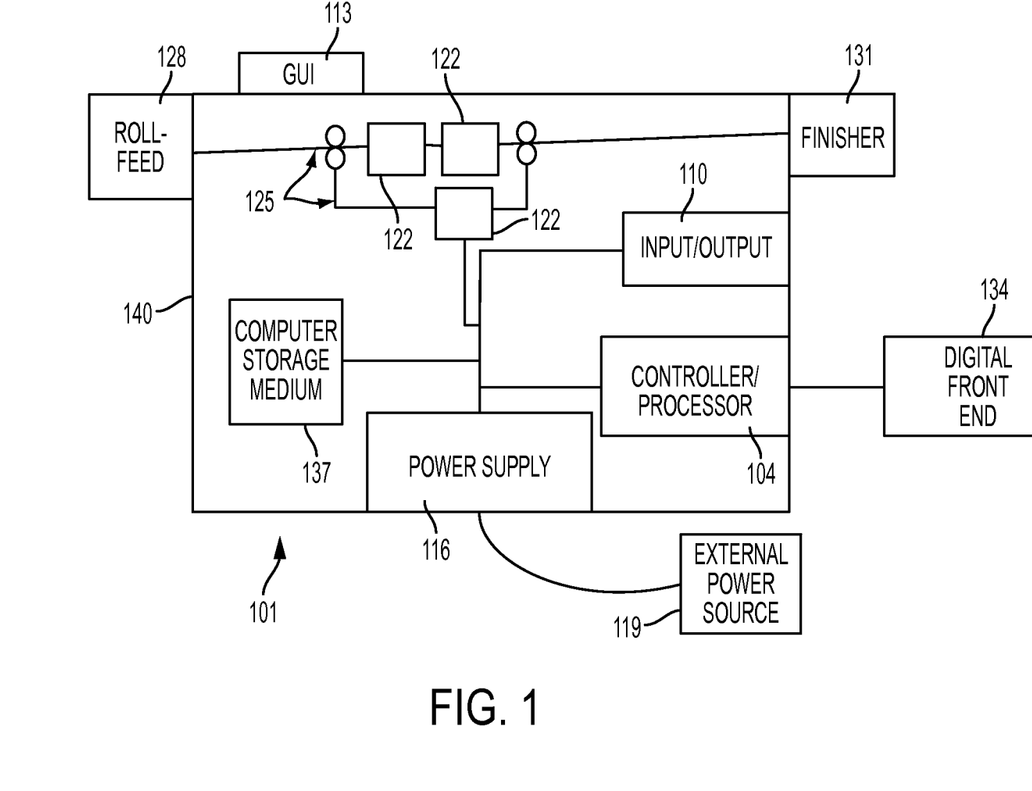
FIG. 1 is a side-view schematic diagram of a continuous feed printing device according to systems and methods herein.
Figure 10:
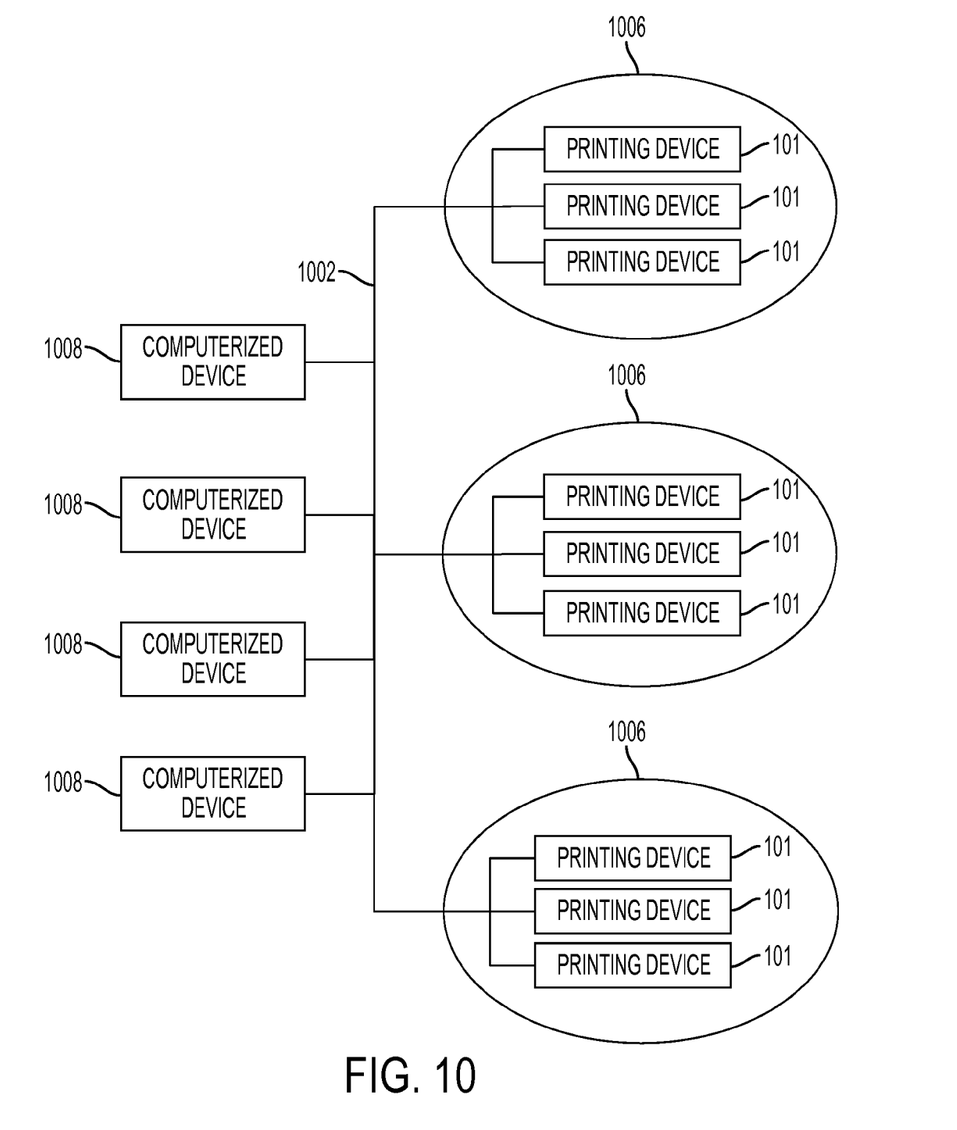
FIG. 10 is a schematic diagram illustrating systems and methods herein.

FIG. 1 illustrates a continuous feed printing device 101 that can be used with systems and methods herein and can comprise, for example, a printer engine, preprocessor roll feeder, postprocessor finisher, and Digital Front End, Controller, etc. The continuous feed printing device 101 includes a controller/processor 104 and an input/output device 110 operatively connected to the controller/processor 104. The continuous feed printing device 101 may be connected to a computerized network 1002 external to the continuous feed printing device 101 through a communications port of the input/output device 110, such as shown in FIG. 10, described below. In addition, the continuous feed printing device 101 can include at least one accessory functional component, such as a graphic user interface (GUI) 113. The GUI 113 acts as common interface for print job submission and operates on power supplied from a power supply 116. An external power source 119 may provide electrical power to the continuous feed printing device 101 through the power supply 116. The input/output device 110 is used for communications to and from the continuous feed printing device 101. The controller/processor 104 controls the various actions of the continuous feed printing device 101.

The continuous feed printing device 101 may include at least one marking device 122 (sometimes referred to as a printing engine) operatively connected to the controller/processor 104. A media path 125 is positioned to supply sheets of media from an input roll-feed media supply 128 to the marking device(s) 122, etc., along the media path 125. The roll-feed media supply 128 supports internal box-fed, pin-fed, fan-fold media types. After receiving various markings from the printing engine(s), the sheets of media can optionally pass to a finisher 131 which can fold, staple, sort, etc., the various printed sheets.

A marking device 122 is any device capable of rendering the image. The set of marking devices includes, but is not limited to, digital document reproduction equipment and other copier systems, as are widely known in commerce, photographic production and reproduction equipment, monitors and other displays, computer workstations and servers, including a wide variety of color marking devices, and the like.

To render an image is to reduce the image data (or a signal thereof) to viewable form; store the image data to memory or a storage device for subsequent retrieval; or communicate the image data to another device. Such communication may take the form of transmitting a digital signal of the image data over a network.

A Digital Front End (DFE) 134 is connected to the controller/processor 104 of the continuous feed printing device 101. The DFE 134 prepares and processes a job for the print engine and includes one or more RIPs (raster image processors) that render from a page description language (PDL) such as PostScript, PDF or XPS to a raster: a pixel-based representation of the page suitable for delivery to the print heads of the marking device 122. The DFE 134 is able to load files from various sources on a network, such as shown in FIG. 10, and process them in order to be printed on digital equipment, whether it be a small desktop printer or a large digital press. The controller/processor 104 takes the imposed print ready input from DFE 134 and controls the print engine 122 for printing.

According to systems and methods herein, the DFE 134 may comprise a special purpose processor that is specialized for processing image data and includes a dedicated processor that would not operate like a general purpose processor because the dedicated processor has application specific integrated circuits (ASICs) that are specialized for the handling of image processing operations, processing image data, calculating pixel values, etc. In one example, the continuous feed printing device 101 is special purpose machine that includes a specialized image processing card having unique ASICs for providing image processing instructions, includes specialized boards having unique ASICs for input and output devices to speed network communications processing, a specialized ASIC processor that performs the logic of the methods described herein using dedicated unique hardware logic circuits, etc. It is contemplated that the DFE 134 may comprise a raster image processor (RIP). A raster image processor uses the original image description to RIP the print job. Accordingly, the print instruction data is converted to a printer-readable language. The print job description is generally used to generate a ready-to-print file. The ready-to-print file may be a compressed file that can be repeatedly accessed for multiple (and subsequent) passes.

The continuous feed printing device 101 may also include a non-transitory computer storage medium 137 (which can be optical, magnetic, capacitor based, etc.) that is readable by the controller/processor 104 and stores instructions that the controller/processor 104 executes to allow the continuous feed printing device 101 to perform its various functions, such as those described herein.

Thus, as shown in FIG. 1, a device housing 140 has one or more functional components that operate on power supplied from the external power source 119, which may comprise an alternating current (AC) power source, through the power supply 116. The power supply 116 can comprise a power storage element (e.g., a battery) and connects to the external power source 119. The power supply 116 converts the electrical power from the external power source 119 into the type of power needed by the various components of the continuous feed printing device 101.

As would be understood by those ordinarily skilled in the art, the continuous feed printing device 101 shown in FIG. 1 is only one example and the systems and methods herein are equally applicable to other types of printing devices that may include fewer components or more components. For example, while a limited number of printing engines and paper paths are illustrated in FIG. 1, those ordinarily skilled in the art would understand that many more paper paths and additional printing engines could be included within any printing device used with systems and methods herein.

Figure 2:
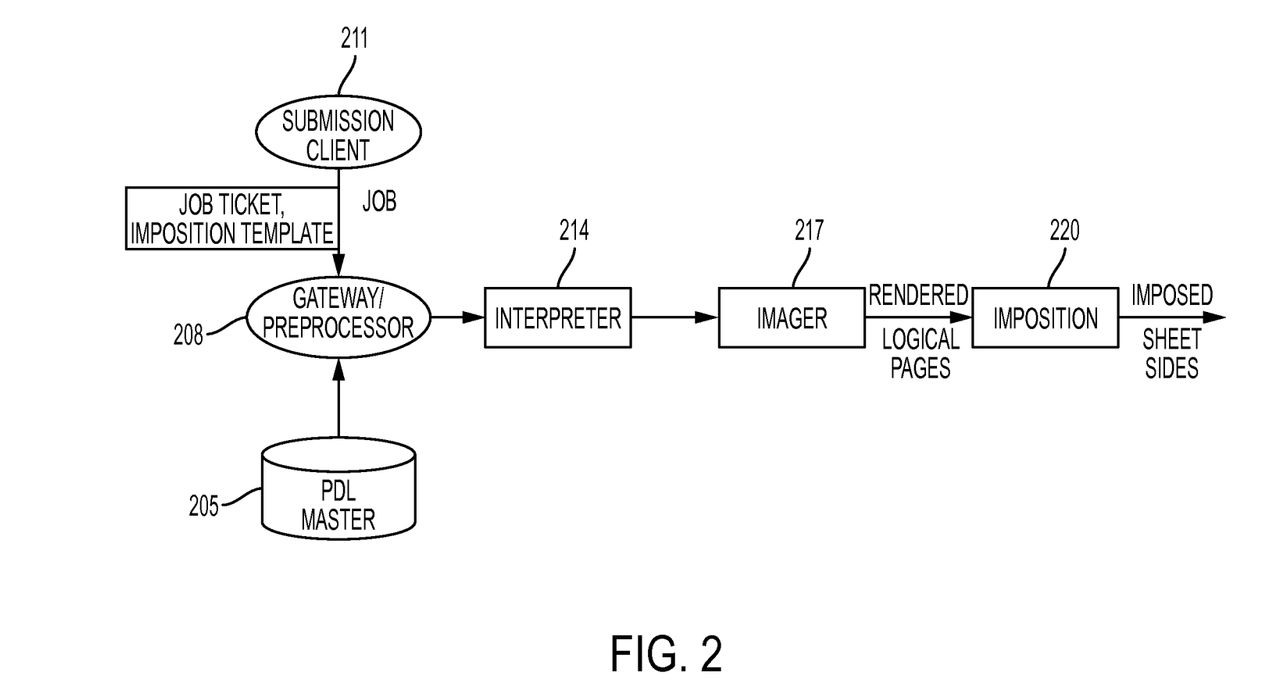
FIG. 2 is a flow diagram illustrating a broad overview of a process according to systems and methods herein.

As shown FIG. 2, an incoming job may include a PDL file 205 that describes the appearance of a printed page according to the print job. The input may be a page description using a page description language (PDL). A page description language (PDL) is a computer language that describes for the print engine the appearance of a printed page in a higher level than an actual output bitmap. The PDL file 205 specifies the arrangement of the printed page through commands for the print engine.

An exemplary processing system may include a gateway/preprocessor 208, to implement network communication protocols for reception of document print requests and administration requests from a submission client 211. The gateway/preprocessor 208 converts client jobs into internal system jobs. An interpreter 214 may be used in a preprocessing step to interpret a specified number of job pages.

The interpreter 214 and imager 217 are classic components of a two-part raster image processor (RIP), such as may be used to prepare the job for printing. As would be known by one skilled in the art, a raster image processor is a component used in a printing system that produces a raster image, also known as a bitmap. The bitmap is then sent to a printing device for output. Raster image processing is the process that turns the job input information into a high-resolution raster image. The input may be a page description using a page description language (PDL) of higher or lower resolution than the output device. In the latter case, the RIP applies either smoothing or interpolation to the input bitmap to generate the output bitmap. According to systems and methods herein, the interpreter 214 parses the PDL file 205 according to PDL-specific language constructs, and changes these into pdl-language neutral "objects" that are presented to the imager 217 for collection. In this way, various language-specific interpreters can be mated with a single imager implementation.

According to systems and methods herein, the Imposition 220 is responsible for calculating the logical page size and imposing the logical images. Imposition 220 receives rendered logical pages from imager 217 and imposes the pages on the sheet to create an n-up sheet side based on the imposition template.

To print an image, a print engine processor, sometimes referred to herein as an image processor, converts the image in a page description language or vector graphics format to a bit mapped image indicating a value to print at each pixel of the image. Each pixel may represent a dot, also called a picture element or pixel. The sequence of dots forming a character is called a raster pattern. The number of dots per inch that a printer generates is called the print resolution, or density. A resolution of 240 pixels means that a printer prints 240 pixels per inch both vertically and horizontally, or 57,600 pixels per square inch (240×240).

Each bit representing a pixel that is "on" is converted to an electronic pulse. The electronic pulses generated from the raster pixel data at which to deposit toner turns the laser beam on to positively charge the surface of a rotating drum, which is an organic photo-conducting cartridge (OPC), that has a coating capable of holding an electrostatic charge. The laser beam turns on and off to beam charges at pixel areas on a scan line across the drum that will ultimately represent the output image. After the laser beam charges all pixels on the scan line indicated in the raster data, the drum rotates so the laser beam can place charges on the next scan line. The drum with the electrostatic positive charges then passes over negatively charged toner. The negatively charged toner is then attracted to the positive charged areas of the drum that form the image. The paper, which is negatively charged, passes over the roller drum and attracts the toner as the areas of the roller drum with the toner are positively charged to transfer the toner forming the image from the roller drum to the paper.

Figure 3A:
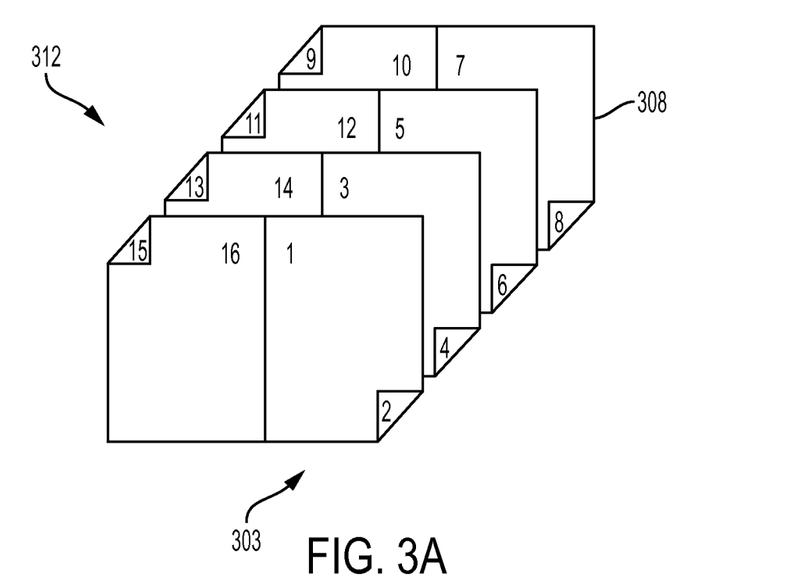
FIGS. 3A and 3B show a representation of aligned pages after imposition is applied and how a final product might appear after finishing.
Figure 3B:
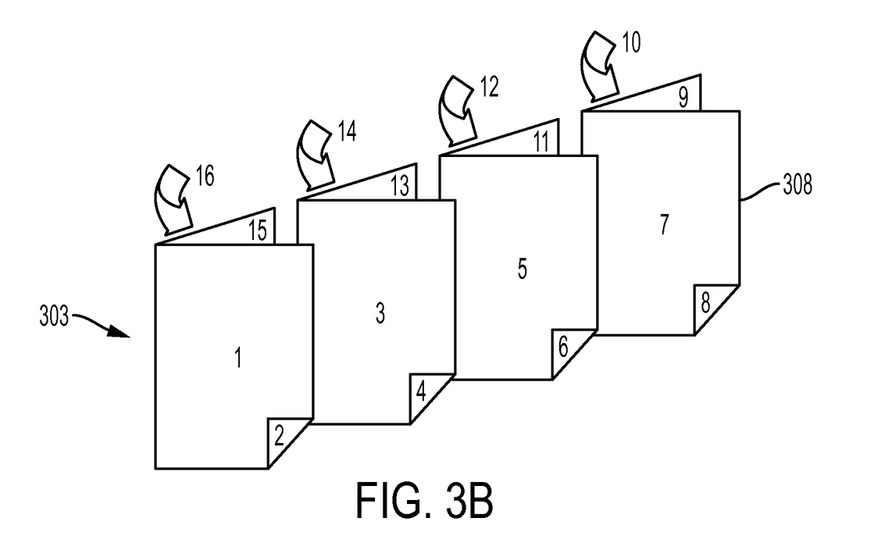

Referring to FIG. 3A, a signature 303 is a group of pages 308 that are printed on both sides of a sheet of print media, generally shown as 312. The print media 312 is then folded, cut, and trimmed down to the finished page size. The number of pages 308 on a signature depends on the size of the page and the size of the print media 312 the pages are fit on. Imposition refers to the placement and direction of the pages 308 contained in a signature 303. Some pages may appear upside down or backwards, but once the sheet is folded and cut, the pages will be in their proper position and sequence. FIG. 3A shows a stacked output of an exemplary sixteen-page signature using a press sheet with four pages printed on each side. FIG. 3B shows how final product might appear after printing and folding.

Typically, imposition is performed somewhat dynamically by using the loaded web stock size values from the print engine. In this case, imposition software requests the loaded stock width and length (actual form width and length dimensions) values from the print engine interface, instead of using web frame width and length values defined in the selected imposition template. A callback routine looks for web stock size changes in the print engine. If there are changes in the web stock size on the continuous feed printer, then the changes are notified to the imposition software and the print jobs are dynamically imposed according to the loaded web stock size values. If there is a change in the web stock size while the jobs are printing, then unprinted jobs will be faulted instead of continuing with wrong media size.

According to systems and methods herein, imposition can be performed automatically as the size of the web stock is changed. That is, the position and size of the imposed frame is determined automatically, based on the size of the print media. The Valid Printable Area (VPA) represents the printable area on the web in which imposition objects, such as job page images and print marks can be placed. If there are changes in the web stock size on the continuous feed printer (width and/or length), then the imposed frame and VPA on the web size values are re-calculated according to the dynamically loaded media size values, and the pages are automatically positioned within the new imposed frame. The imposed frame contains the composite page with one or more pages.

Figure 4A:
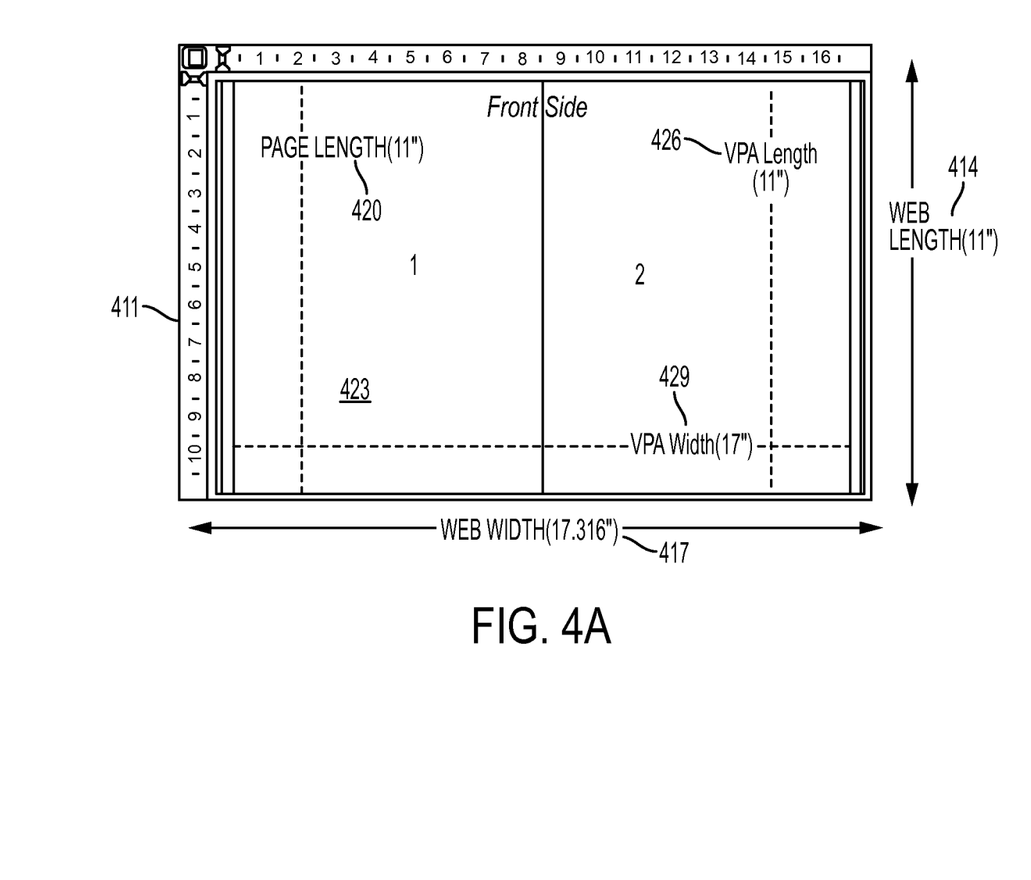
FIGS. 4A-4C illustrate different frame sizes according to systems and methods herein.
Figure 4B:
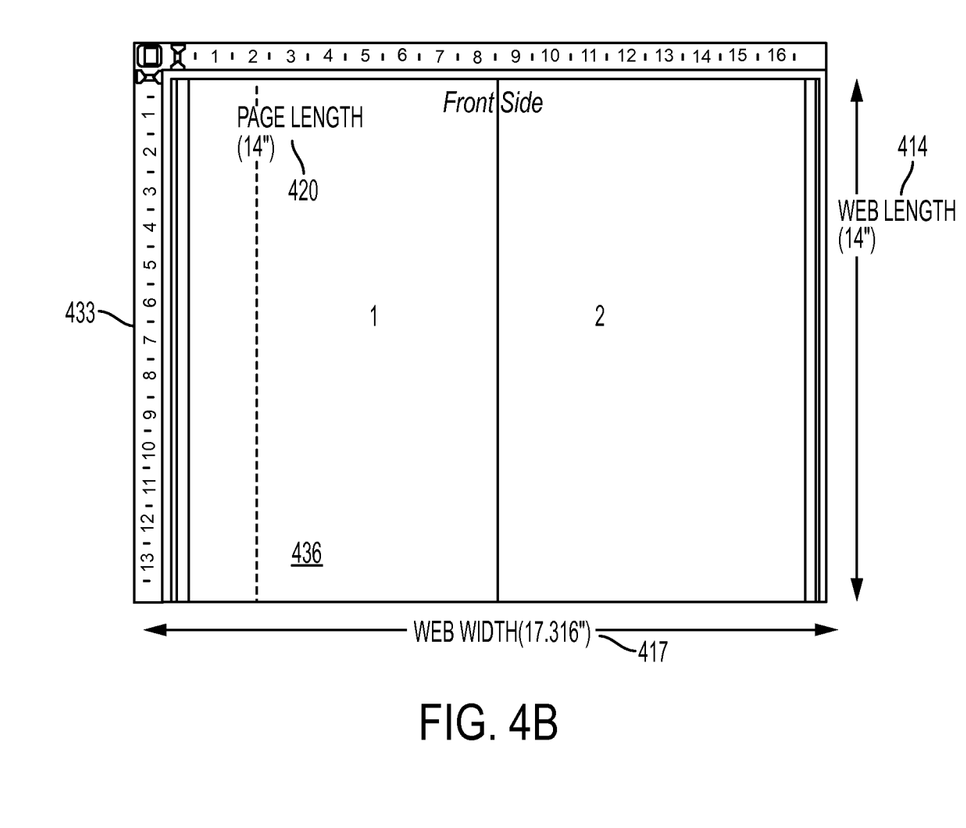
Figure 4C:
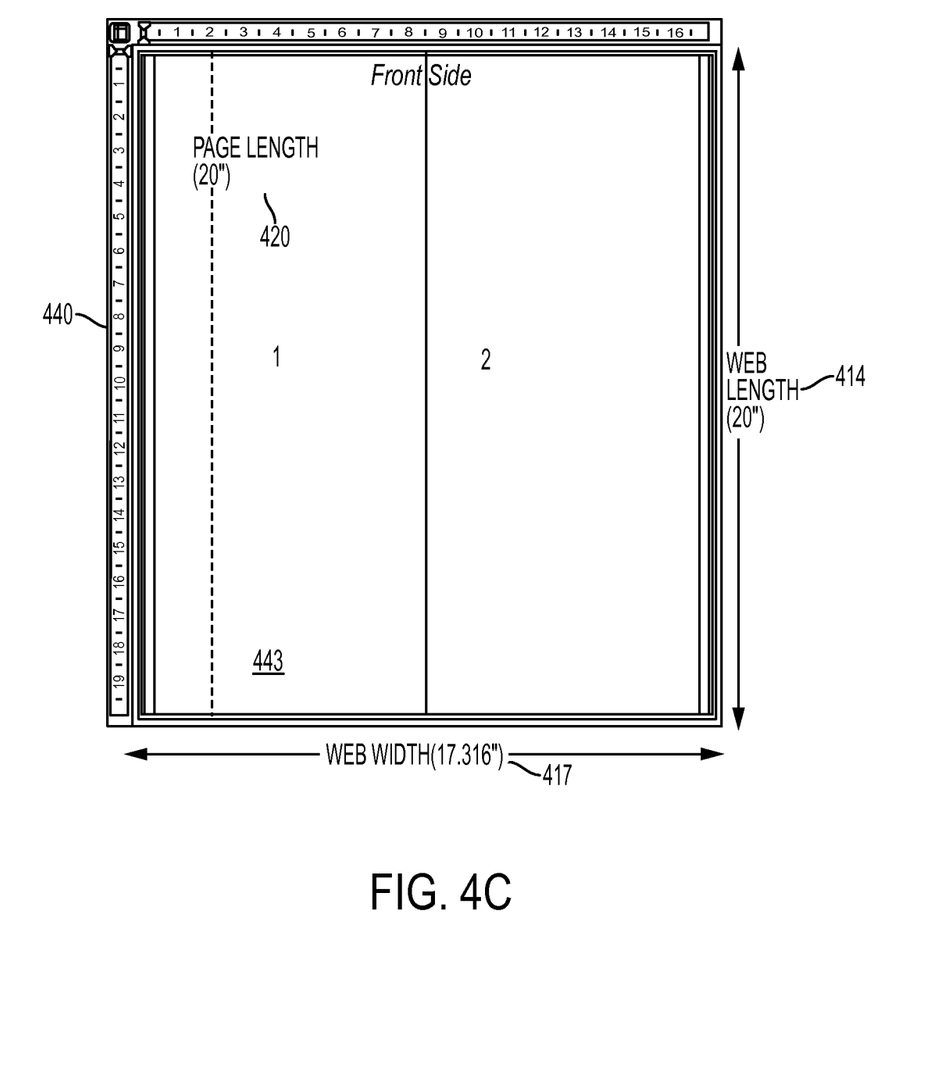

Typically, a print job is received into a printer in order to print a document. The print job may include certain attributes defining the arrangement of images in the document. The arrangement is usually created for predefined dimensions of print media. Whenever there is a change in loaded stock size width and/or length values, the imposition web width and/or web length and VPA values will be changed accordingly. FIG. 4A shows a web frame 411 having a web length 414 of 11 inches and a web width 417 of 17.316 inches. The page length 420 is 11 inches. In this case, the valid printable area (VPA) 423 has a VPA length 426 of 11 inches and a VPA width 429 of 17 inches. An imposed page can be positioned within the 17×11 valid printable area 423. An initial print job imposes one or more pages in the valid printable area 423. FIG. 4B shows a change in which the print engine is loaded with web stock having a different web length 414. As shown in FIG. 4B, the web length 414 is changed to 14 inches. In other words, the page length 420 is changed to 14 inches. The web width 417 remains at 17.316 inches. In this case, the automatic imposition changes the size of the web frame 433 and the resultant valid printable area (VPA) 436. An imposed page can be positioned within the 17×14 valid printable area 436. FIG. 4C shows a change in which the print engine is loaded with web stock having a different web length 414. As shown in FIG. 4C, the web length 414 is changed to 20 inches. In other words, the page length 420 is changed to 20 inches. The web width 417 remains at 17.316 inches. In this case, the automatic imposition changes the size of the web frame 440 and the resultant valid printable area (VPA) 443. An imposed page can be positioned within the 17×20 valid printable area 443.

Figure 5:
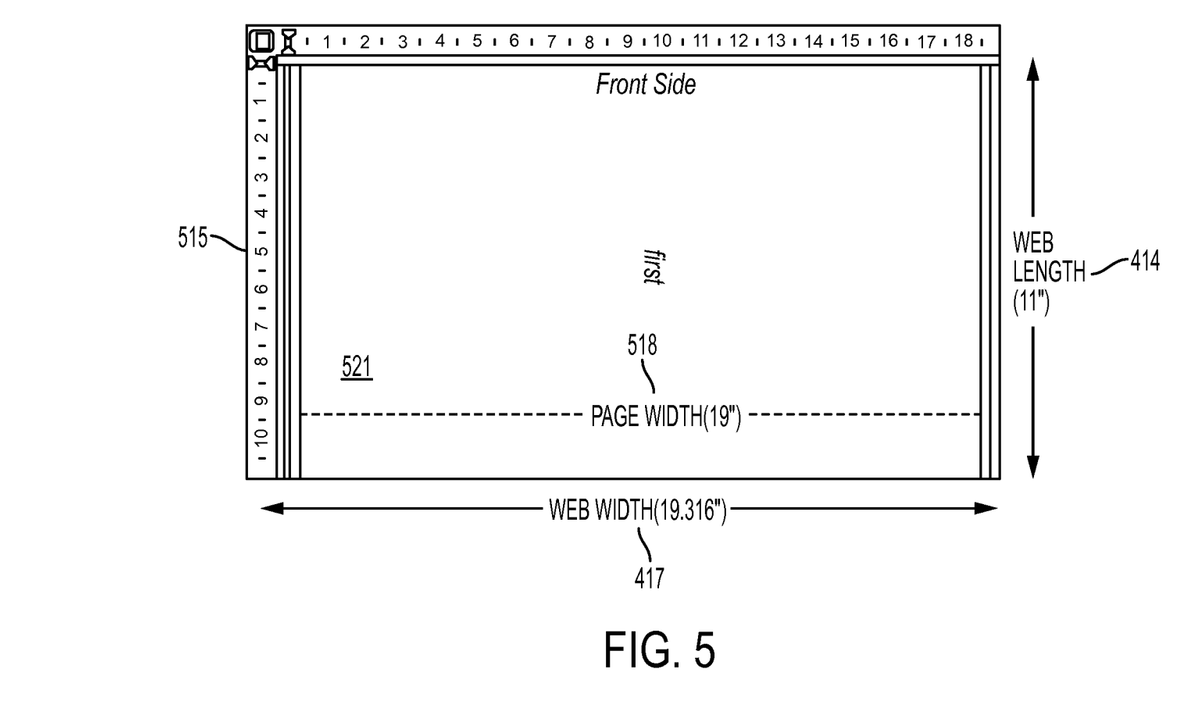
FIG. 5 illustrates another frame size according to systems and methods herein.

FIG. 5 shows a web frame 515 in which the print engine is loaded with web stock having a web length 414 of 11 inches and a web width 417 of 19.316 inches. As shown in FIG. 5, the page width 518 is 19 inches. In this case, the automatic imposition adjusts the valid printable area (VPA) to correspond to the web frame 515. An imposed page can be positioned within the 19×11 valid printable area in a web frame 515 of 19.316×11.

Figure 6:
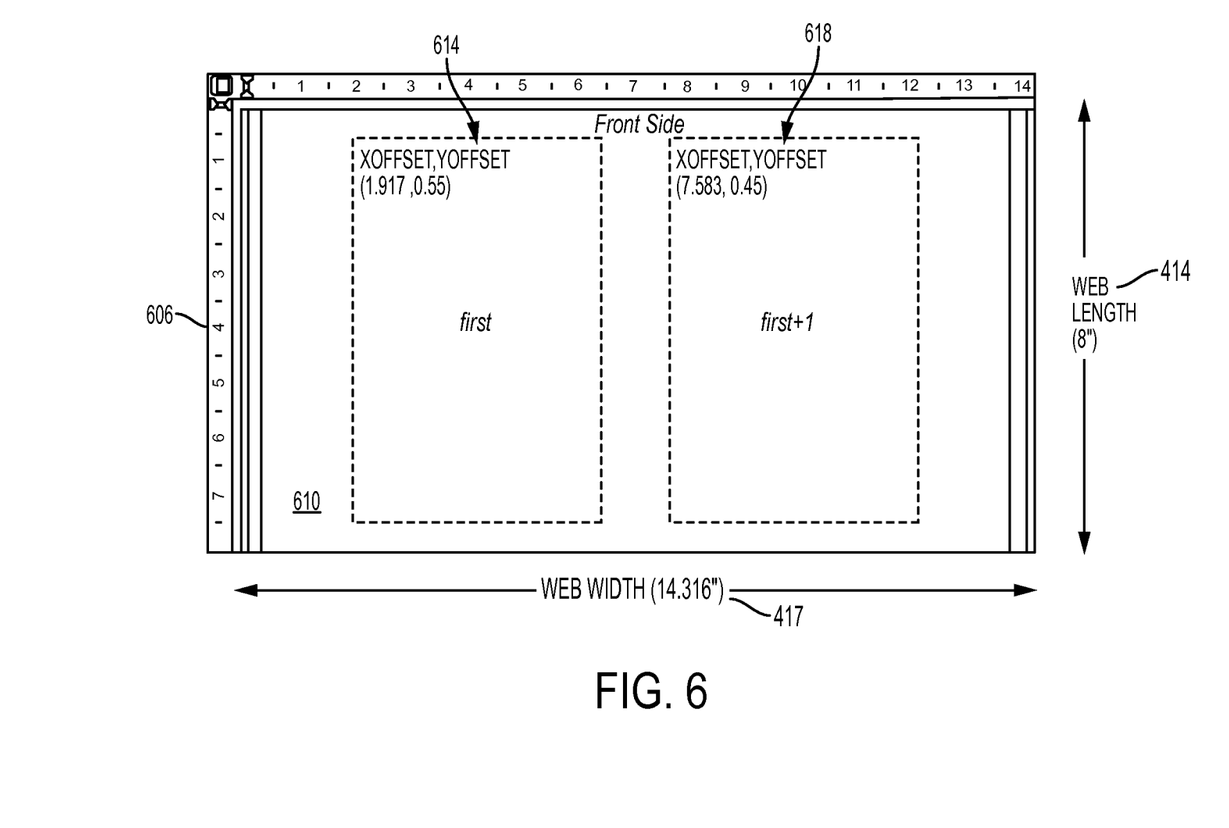
FIG. 6 illustrates a centered imposed frame according to systems and methods herein.

Referring to FIG. 6, if centering is specified in the original imposition, then automatic imposition continues to honor centering with loaded stock size values. FIG. 6 shows a web frame 606 having a web length 414 of 8 inches and a web width 417 of 14.316 inches. In this case, the page length is 7 inches. The valid printable area (VPA) 610 has a VPA width of 14 inches. Centering, as shown in FIG. 6, may include a first page x and y offset 614 from the top and left side of the VPA 610 and a second page x and y offset 618 from the top and left side of the VPA 610.

Figure 7:
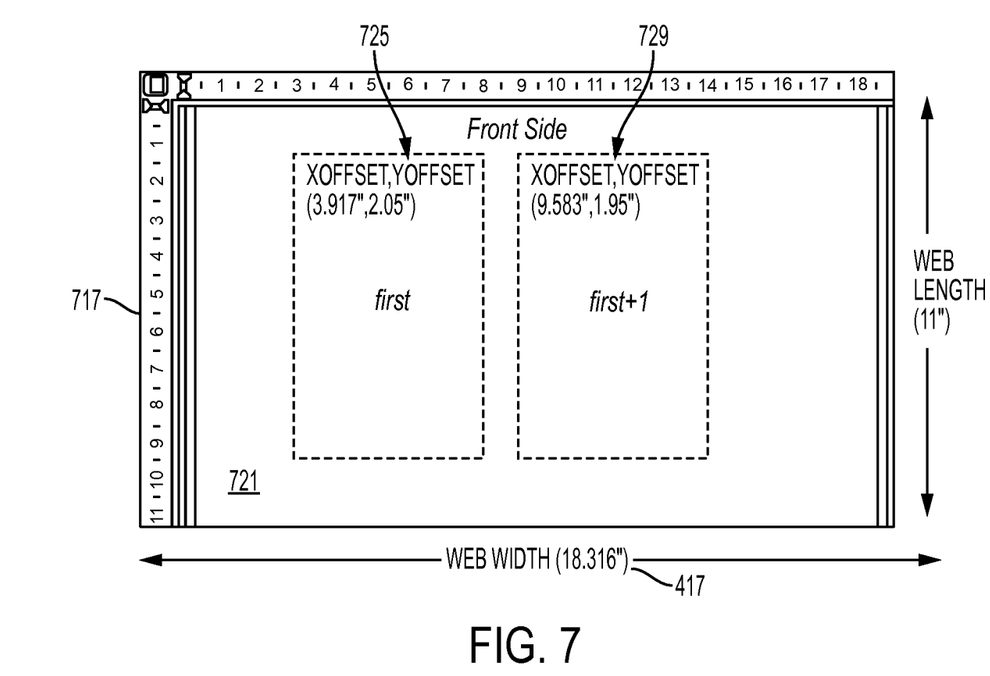
FIG. 7 illustrates a valid print area for a centered imposed frame according to systems and methods herein.

FIG. 7 shows a web frame 717 in which the print engine is loaded with web stock having a web length 414 of 11 inches and a web width 417 of 18.316 inches. FIG. 7 shows the imposition template adjusted from FIG. 6 according to the loaded stock size changes (18.316×11) for the print engine. The valid printable area (VPA) 721 measures 18×11. For the loaded web stock size changes, the automatic imposition calculates new page offset values for centering. For example, according to the dynamically loaded media size values, centering may overwrite the x and y position offsets of individual pages but will preserve the relative spacing of the individual pages on the sheet. If the loaded frame width/length is greater than the frame width/length defined in the imposition, a new offset value is calculated from the old offset value by adding an adjustment equal to (frame width/length from engine-frame width/length from imposition)/2. If the loaded frame width/length is less than the frame width/length defined in the imposition, a new offset value is calculated from the old offset value by subtracting an adjustment equal to (frame width/length from imposition-frame width/length from engine)/2. As shown in FIG. 7, the first page x and y offset 725 (which is indicated from the top and left side of the VPA 721) and the second page x and y offset 729 (which is indicated from the top and left side of the VPA 721) have been automatically adjusted for the larger size of the loaded web stock.

Figure 8:
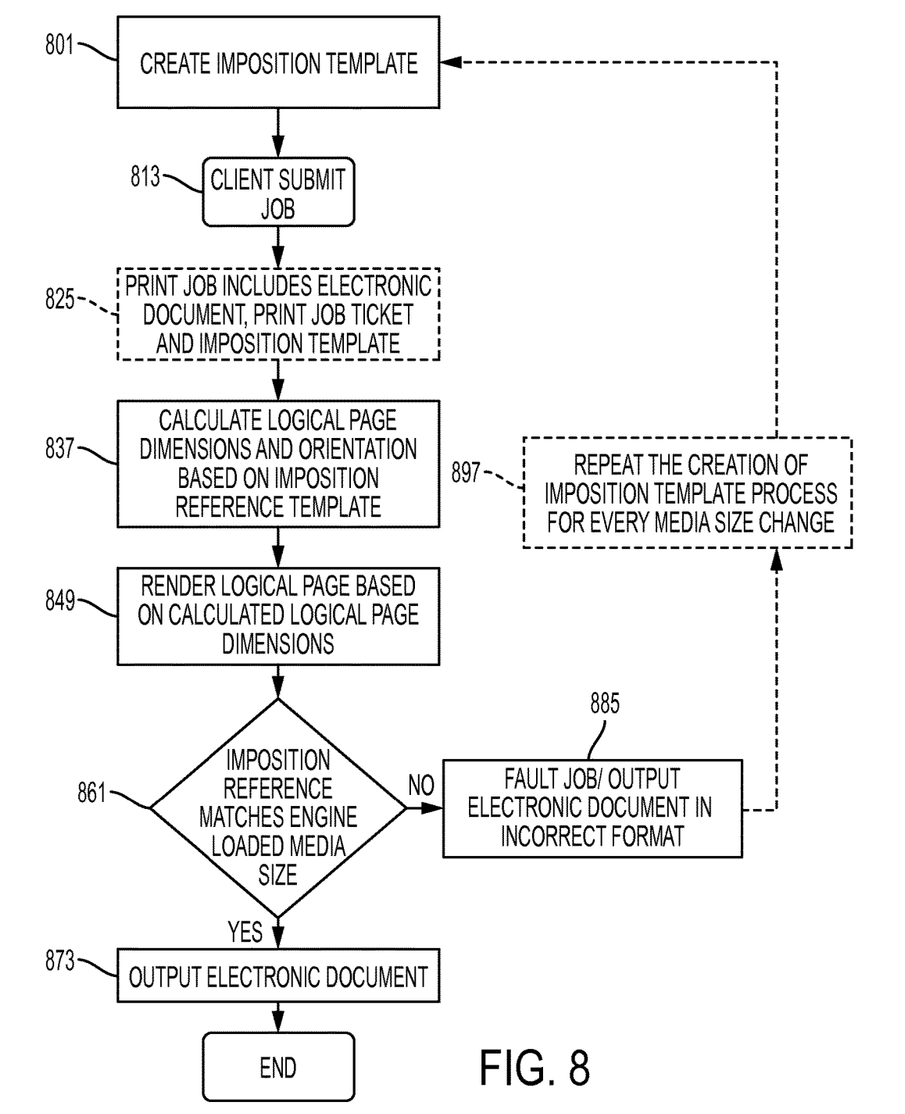
FIG. 8 is a flow diagram illustrating imposition methods.

FIG. 8 is a flow diagram illustrating the processing flow of a normal imposition and printing process. At 801, a Printer Operator/Client creates an imposition template that includes media size, crop box size, arrangement of pages, e.g. 1-up, 2-up, n-up, page offset, centering, and optional scaling based on predefined dimensions of continuous feed print media. The imposition template is typically based on size of the media loaded on the print engine. For example, consider imposition template being defined for a frame size as 17×11 (i.e., 17" width and 11" length). At 813, the 5, the print job comprises an electronic document, a print job ticket, and the imposition template. At 837, the computerized device calculates the logical page dimensions and valid print area for the prescribed orientation based on the imposition template. At 849, the computerized device renders a logical page based on the calculated logical page dimensions. If, at 861, the imposition template matches the loaded media size, then, at 873, the computerized device outputs the electronic document using the imposition attributes specified in imposition template. During operation, the continuous feed print web stock size may be modified to 17×14 (i.e., 17" width and 14" length) in order to print a 14-inch length job. If, at 860, the imposition template does not match the loaded media size, then, at 885, the electronic document is either printed in incorrect format or the job is faulted as mismatch in loaded media size values and the predefined imposition. In order to complete the print job with the modified web stock size, the Printer Operator/Client is required to repeat the creation of imposition templates for every media size change, as shown at 897.

Considering the numerous combinations of web stock sizes would require numerous impositions and produce extra work for printer operator in order to change the imposition whenever there is a change in web stock sizes. However, according to systems and methods herein, the change in media size causes automatic changes in imposition parameters; therefore, a revised print job is created for the printer. Systems and methods disclosed herein are particularly useful for continuous feed printing devices using infinite roll paper because the imposition designer does not need to define an imposition and queue for every permutation of web stock sizes.

Figure 9:
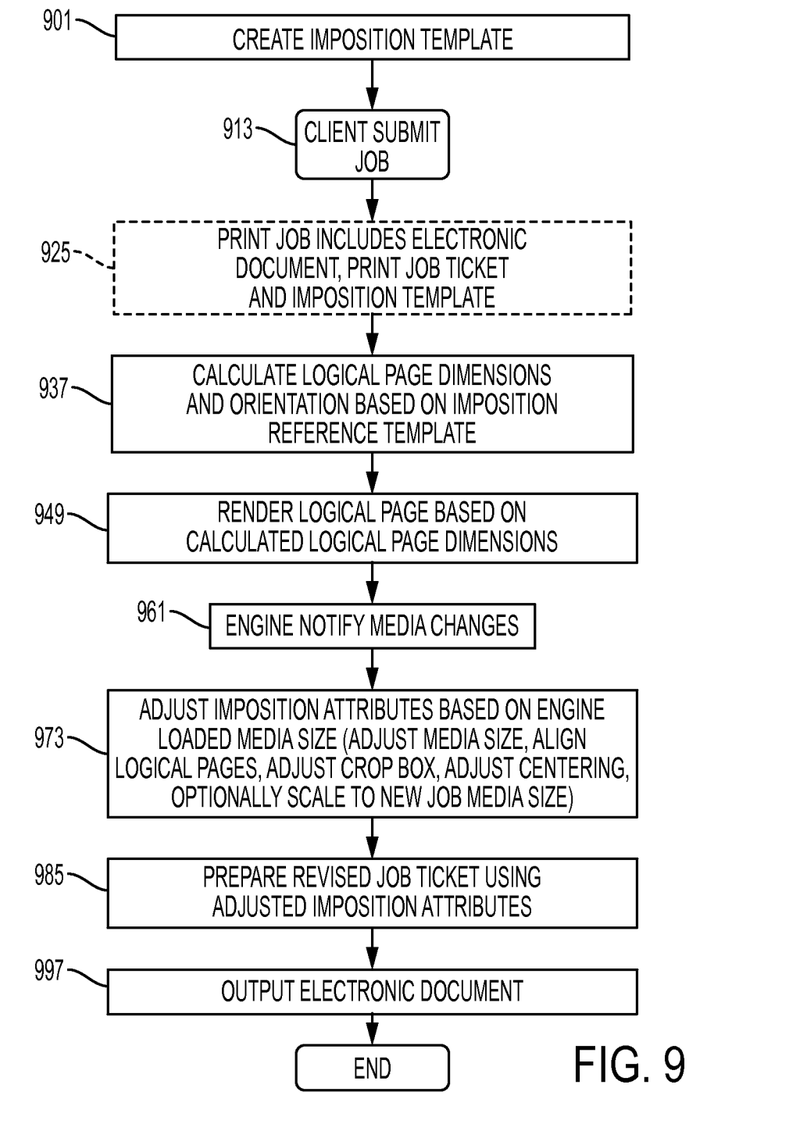
FIG. 9 is a flow diagram illustrating methods according to systems and methods herein.

FIG. 9 is a flow diagram illustrating the processing flow of an exemplary method according to systems and methods herein. At 901, the Printer Operator/Client creates the imposition template that includes media size, crop box size, arrangement of pages, page offset, centering, and optional scaling based on predefined dimensions of continuous feed print media. At 913, the client submits a print job into the computerized device. The computerized device includes a marking device/print engine. As indicated at 925, the print job comprises an electronic document, a print job ticket, and the imposition template. At 937, the computerized device calculates the logical page dimensions and valid print area for the prescribed orientation based on the imposition template. At 949, the computerized device renders a logical page based on the calculated logical page dimensions. At 961, a change in print media being fed into the marking device is automatically detected. At 973, the imposition attributes are automatically modified by the computerized device, based on the change in the print media, without further operator intervention (for re-creating and changing the new imposition template). At 985, the computerized device automatically prepares a revised imposition parameters corresponding to the change in the print media. At 997, the computerized device outputs the electronic document using the revised imposition.

For example, consider imposition being defined in an imposition template for a frame size as 17×11 (i.e., 17" width and 11" length). During operation, the continuous feed print web stock size is modified to 17×14 (i.e., 17" width and 14" length) in order to print a 14-inch length job. According to devices and methods herein, the imposed frame and page length are accommodated automatically to match with 17×14 dimension changes. Using the methods herein, the imposition is defined; the imposed frame and page size are accommodated automatically according to the loaded web stock/media size values.

As shown in FIG. 10, exemplary printers, copiers, multi-function machines, and continuous feed printing devices 101 may be located at various different physical locations 1006. Other devices according to systems and methods herein may include various computerized devices 1008. The computerized devices 1008 can include print servers, printing devices, personal computers, etc., and are in communication (operatively connected to one another) by way of a network 1002. The network 1002 may be any type of network, including a local area network (LAN), a wide area network (WAN), TCP/IP Ethernet Gigabit or a global computer network, such as the Internet.

While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, it is not intended for the claims presented below to be limited by the attached drawings, but instead the attached drawings are merely provided to illustrate a few ways in which the claimed features can be implemented.

The hardware described herein plays a significant part in permitting the foregoing method to be performed, rather than function solely as a mechanism for permitting a solution to be achieved more quickly, (i.e., through the utilization of a computer for performing calculations). For example, these methods automatically adjust the imposition parameters based on changes in web stock, without requiring operator intervention. Therefore, such processes as detecting a change in print media, calculating the web frame, determining imposition, and creating a revised print job require the use of a computerized image processor to both access the image and to process the image.

As would be understood by one ordinarily skilled in the art, the processes described herein cannot be performed by human alone (or one operating with a pen and a pad of paper) and instead such processes can only be performed by a machine. Specifically, processes such as printing, scanning, altering positioning of images using an image processor etc., require the utilization of different specialized machines. Therefore, for example, the detection of a change in media properties, preparing of a revised imposition, and printing/scanning, which are performed by the devices herein, cannot be performed manually (because machines are required to perform digital image processing and printing) and such devices are integral with the processes performed by methods herein. Further, such machine-only processes are not mere "post-solution activity" because the modification of print job attributes based on the change in print media by a processor is integral with the steps of the processes described herein. Similarly, the receipt of a print job and conversion of data utilize special-purpose equipment (telecommunications equipment, routers, switches, etc.) that is distinct from a general-purpose processor. In other words, these various machines are integral with the methods herein because the methods cannot be performed without the machines (and cannot be performed by humans alone).

Additionally, the methods herein solve many highly complex technological problems. For example, job pages are automatically positioned within the imposed frame. Methods herein solve this technological problem by automatically detecting a change in media properties and preparing a revised imposition having different imposition parameters corresponding to the change in the media properties. This is especially useful in solving this technological problem because it avoids printer faults due to of a mismatch in loaded media size. By granting such benefits, the methods herein reduce the amount and complexity of hardware and software needed to be purchased, installed, and maintained, thereby solving a substantial technological problem that is experienced today.

Many computerized devices are discussed above. Computerized devices that include chip-based central processing units (CPU's), input/output devices (including graphic user interfaces (GUI), memories, comparators, processors, etc. are well-known and readily available devices produced by manufacturers such as Dell Computers, Round Rock Tex., USA and Apple Computer Co., Cupertino Calif., USA. Such computerized devices commonly include input/output devices, power supplies, processors, electronic storage memories, wiring, etc., the details of which are omitted herefrom to allow the reader to focus on the salient aspects of the embodiments described herein. Similarly, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well known by those ordinarily skilled in the art and are not described in detail herein to keep this disclosure focused on the salient features presented. The systems and methods herein can encompass devices that print in color, monochrome, or handle color or monochrome image data. All foregoing systems and methods are specifically applicable to electrostatographic and/or xerographic machines and/or processes.

The terminology used herein is for the purpose of describing particular systems and methods only and is not intended to be limiting of this disclosure. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In addition, terms such as "right", "left", "vertical", "horizontal", "top", "bottom", "upper", "lower", "under", "below", "underlying", "over", "overlying", "parallel", "perpendicular", etc., used herein, are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements). Further, the terms "automated" or "automatically" mean that once a process is started (by a machine or a user), one or more machines perform the process without further input from any user.

The corresponding structures, materials, acts, and equivalents of all means or step plus function elements in the claims below are intended to include any structure, material, or act for performing the function in combination with other claimed elements as specifically claimed. The descriptions of the various systems and methods of the present disclosure have been presented for purposes of illustration, but are not intended to be exhaustive or limited to the systems and methods disclosed. Many modifications and variations will be apparent to those of ordinary skill in the art without departing from the scope and spirit of the described systems and methods. The terminology used herein was chosen to best explain the principles of the systems and methods, the practical application or technical improvement over technologies found in the marketplace, or to enable others of ordinary skill in the art to understand the systems and methods disclosed herein.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. A method, comprising:
    receiving a print job into a computerized device comprising a marking device, said print job comprising an electronic document and print job attributes including an imposition template defining an arrangement of images in said electronic document for predefined length and width dimensions of print media;
    receiving a first continuous web of print media having first length and width dimensions into said marking device;
    determining a first valid printable area for said marking device based on said first length and width dimensions of said first continuous web of print media;
    printing said electronic document on said first continuous web of print media according to said print job imposition attributes, using said marking device;
    receiving a second continuous web of print media having second length and width dimension into said marking device;
    automatically, using said computerized device, detecting a change in the dimensions of the continuous web of print media being fed into said marking device, relative to said predefined length and width dimensions of print media;
    determining a second valid printable area for said marking device based on said second length and width dimensions of said second continuous web of print media; and
    automatically, using said computerized device, producing modified print job imposition attributes for said print job based on said change in the dimensions of said continuous web of print media being fed into said marking device, without further operator intervention.

2. The method according to claim 1, said marking device comprising a continuous feed printing device.

3. The method according to claim 1, said automatically detecting a change in the dimensions of said print media being fed into said marking device comprising determining length and width dimensions for said second continuous web of print media.

4. The method according to claim 1, further comprising:
    automatically calculating revised print job imposition attributes defining alignments and positioning of said images in said electronic document for said second valid printable area; and
    printing said electronic document according to said modified print job imposition attributes, using said marking device.

5. The method according to claim 1, said receiving a print job further comprising:
    receiving a PDL file;
    parsing said PDL file; and
    identifying objects from said PDL file.

6. A method comprising:
    receiving, into a computerized device, an electronic document having a print job ticket comprising job ticket parameters and an imposition template defining layout parameters for predefined length and width dimensions of print media;
    receiving a first continuous web of print media having first length and first width dimensions being fed into said computerized device;
    outputting, from said computerized device, a printed version of said electronic document according to said print job ticket;

receiving a second continuous web of print media having second length and second width dimensions being fed into said computerized device;

automatically, using said computerized device, detecting a change in at least one of the length dimension and the width dimension of the continuous web of print media being fed into said computerized device, relative to said predefined length and width dimensions of print media;

automatically, using said computerized device, preparing a revised imposition having different imposition parameters corresponding to said change in the at least one of the length dimension and the width dimension of said print media; and outputting, from said computerized device, a printed version of said electronic document using said revised imposition.

7. The method according to claim 6, said computerized device comprising a continuous feed marking device.

8. The method according to claim 6, said imposition template defining an arrangement of images in said electronic document for predefined dimensions of print media.

9. The method according to claim 6, said preparing said revised imposition further comprising:

determining a valid printable area for said computerized device based on said second length and said second width dimensions of said second continuous web of print media being fed into said computerized device;

aligning logical pages of said electronic document on an imposed frame based on said second length and said second width dimensions of said second continuous web of print media;

positioning said imposed frame on a sheet frame according to said change in the dimensions of said print media;

automatically adjusting crop box, aligning centering and optionally scaling based on said second length and said second width dimensions of said second continuous web of print media; and automatically calculating revised imposition parameters defining a different arrangement of images in said electronic document for said valid printable area.

10. A computerized device comprising:

a processor receiving images of a document and instructions to print said document using imposition parameters defining a first arrangement of said images in said document, said first arrangement of said images corresponding to predetermined length and width dimensions of a first valid printable area for a continuous web of print media to be fed into said computerized device, said computerized device comprising a continuous feed marking device;

said processor automatically detecting said continuous web of print media being fed into a marking device, said continuous web of print media being fed into said marking device having a different valid printable area from said predetermined length and width dimensions of said first valid printable area;

said processor automatically determining a second valid printable area based on said continuous web of print media being fed into said marking device;

said processor automatically transforming said first arrangement of said images in said document into a second arrangement of said images based on said second valid printable area, without further operator intervention;

said processor automatically preparing a print job ticket for said document having job ticket parameters and imposition layout parameters for said second arrangement of said images; and said processor outputting said document to said marking device using said print job ticket and imposition.

11. The computerized device according to claim 10, said preparing said imposition further comprising:

determining said second valid printable area for said computerized device based on length and width dimensions of said continuous web of print media being fed into said computerized device; and automatically calculating revised imposition layout parameters defining a different alignment and positioning of images in said document for said second valid printable area.

* * * * *